United States Patent Office 3,592,593
Patented July 13, 1971

3,592,593
PURIFICATION OF THIONYL CHLORIDE
Benno Böhm, Leverkusen, Germany, assignor to Farbenfabriken Bayer Aktiengesellschaft, Leverkusen, Germany
No Drawing. Filed Dec. 6, 1967, Ser. No. 688,358
Claims priority, application Germany, Dec. 10, 1966,
F 50,902
Int. Cl. C01b 17/45
U.S. Cl. 23—203          6 Claims

ABSTRACT OF THE DISCLOSURE

Pure thionyl chloride can be obtained from a crude product containing besides sulfur dioxide and chlorine mainly sulfur chlorides contaminates by evaporating the thionyl chloride at a temperature below the boiling point of sulfur monochloride (disulfur dichloride) and contacting the gaseous thionyl chloride with sulfur containing an effective amount of iron or iron-compounds to convert any sulfur dichloride contaminating the gaseous thionyl chloride to liquid sulfur monochloride.

The present invention is concerned with a process for the purification of thionyl chloride. More particularly the present invention relates to a process for the removal of sulfur chlorides from thionyl chloride.

On a technical scale thionyl chloride usually is obtained by a process wherein sulfur dioxide or sulfur trioxide is reacted with chlorine and sulfur chlorides. Other known processes for the production of thionyl chloride are the direct synthesis from the elements sulfur, oxygen and chlorine and the reaction of sulfuryl chloride with sulfur chlorides.

The end-product of all these known processes is a crude thionyl chloride containing besides sulfur chlorides, sulfur dioxide and chlorine as impurities dissolved in the thionyl chloride. Sulfur dioxide and chlorine can be easily removed by distillation. The recontamination of the thionyl chloride with sulfur dioxide is usually avoided by hot-condensation of the distillate in a so called ascending cooler, i.e. in counterflow to the steam, and by chilling the distillate to ambient temperature (15–30° C.) separately from the steam.

Sulfur dichloride has a boiling point of about twenty degrees below the boiling point of thionyl chloride (79° C.) whereas sulfur monochloride boils at about 138° C. Therefore, one should expect both sulfur chlorides to be separable from the thionyl chloride by fractional distillation. At least a part of the sulfur dichloride is removed with the low boiling fraction of the distillate however during distillation some sulfur dichloride undergoes the reaction $$2SCl_2 \rightleftharpoons S_2Cl + Cl_2 \qquad (1)$$

whereby sulfur monochloride is formed. The sulfur monochloride on the other hand disproportionates according to the reaction $$S_2Cl_2 \rightleftharpoons SCl_2 + S \qquad (2)$$

As the chlorine escapes at the head of the column equilibrium conditions are not established and a pure thionyl chloride cannot be obtained as long as sulfur chlorides are present. A pure product therefore results only after removing the major part of the sulfur dichloride and destroying the removing sulfur chlorides under reflux to sulfur and chlorine.

In order to overcome this drawback it has been proposed to add sulfur to heated liquid thionyl chloride. By this method however only a poor yield of pure thionyl chloride can be obtained in the form of a distillate for reason of the foregoing discussion.

Progress was made by the introduction of a process according to which sulfur is added to the reflux stream at the head of a column in which thionyl chloride is evaporated under a fractional distillation. The sulfur in the reflux stream reacts with the sulfur dichloride thereby reducing the amount of the dichloride in the distillate.

The reaction according to Equation 2 however proceeds slowly. Therefore the sulfur dichloride is only uncompletely removed from the vapors. The last parts of the sulfur dichloride are to be removed by repeated distillation under reflux. This however is hazardous as thionyl chloride forms itself sulfur dichloride under the conditions of prolonged reflux-temperatures:

$$2SOCl_2 \rightleftharpoons SO_2 + Cl_2 + SCl_2$$

It has now been found in accordance with the present invention an improved process for the purification of thionyl chloride by fractionally distilling off thionyl chloride from sulfur chlorides impurities at a temperature lower than the boiling point of sulfur monochloride whereby the gaseous thionyl chloride being distilled is contacted with sulfur to convert to liquid sulfur monochloride the sulfur dichloride contained in said gaseous thionyl chloride, conducting the liquid sulfur monochloride to the still of the column and taking off purified thionyl chloride at the head of the column the improvement which comprises contacting said gaseous thionyl chloride with sulfur containing an effective amount of an active iron product.

Suitable active products which can be used in accordance with the present invention are the sulfides such as FeS, $Fe_2S_3$ and the like, the oxides such as $Fe_2O_3$, $Fe_3O_4$, FeO, finely divided iron powder, the inorganic iron salts such as the chlorides, sulfates, phosphates, nitrates and the like.

Preferably the active iron products are used in finely divided form in an amount of between 0.01 to 10, preferably of about 0.02 to 1 gram calculated as elementary iron per 100 grams of sulfur. For obtaining a highly active material the finely divided active iron products are suspended as homogeneously as possible in molten sulfur which is then molded or merely chilled and disintegrated into pieces. The size and form of sulfur pieces is not important. It must be possible to apply the sulfur lumps into the head of the column on a suitable carrier such as a perforated plate or the like. The bed of solid sulfur is then contacted with the thionyl chloride vapors, whereby a solution of sulfur in thionyl chloride is formed flowing in counter-current direction to the thionyl chloride vapors.

The iron containing sulfur reacts very rapidly with the sulfur dichloride present, thereby avoiding sulfur dichloride contamination of the thionyl chloride which is taken off at the head of the column.

A sufficiently pure thionyl chloride thus can be produced by a single step distillation, wherein the crude product containing the thionyl chloride and the impurities mainly $SO_2$, chlorine and sulfur chlorides is evaporated in a distillation column thereby contacting the vapors with the iron containing sulfur bed provided in the top of the column. From the thionyl chloride vapor the volatile sulfur dichloride is thus removed and a substantially pure product is obtained. According to another embodiment of the present invention the process can be performed also in two steps to yield a still purer product and to improve the efficiency.

In this two-step-process the vapor of the crude thionyl chloride is at first fed into a column having a bed of sulfur pieces as known per se, thereafter the fractional distillation is repeated in a second smaller column containing a bed of the iron-modified sulfur pieces.

By this preferred embodiment of the known process the larger part of the volatile sulfur dichlorides as well as of the sulfur monochloride is removed already in the first step. To remove the smaller amounts of the sulfur dichloride remaining in the distillation product of the first column only a small amount of the iron-modified sulfur is necessary. This has the advantage that only small amounts of the iron compounds are brought into the distillation residue containing mainly sulfur monochloride, sulfur and thionyl chloride. The residues of both steps can be used as starting material for the production of thionyl chloride. The process can be performed in the known types of fractional distilling columns, the invention lies in the process and not in a particular apparatus.

The invention is further illustrated by the following examples without being restricted thereto.

EXAMPLE 1

The process described below was carried out in a distillation equipment which consisted substantially of a flask of 1 litre capacity, which was equipped with an overflow trap, a column of 5 cm. width and 67 cm. length and a reflux condenser. The column was charged at the lower 55 cm. of its length with Raschig rings of 7 mm. diameter, at the upper 12 cm. with lumps of a sulfur preparation which was prepared by stirring 0.2 g. of pyrite cinders into a melt of 300 g./hr. of sulfur.

In the continuous operation 675 g. of a crude thionyl chloride product containing 81% of $SOCl_2$, 14% of $SCl_2$, 2.3% of $S_2Cl_2$, and 2.4% of $SO_2$ was dropwise introduced into a distillation flask so that the flask was continually kept filled with 500 cm.$^3$ of a mixture which consisted of 47.3% of $SOCl_2$, 50.4% of $S_2Cl_2$ and 2.3% of sulfur and which was boiled at 92–93° C. 267 g./h. of the mixture run off via the overflow; the consumption of sulfur in the column amounted to 39 g. per hour. At the same time, 433 g. of the purified product which was free from sulfur chlorides and consisted of more than 99% of water-white $SOCl_2$ were obtained from the condenser.

EXAMPLE 2

The process described below was carried out in a distillation equipment consisting of a gas-heated distillation vessel of 50 l. capacity, which was equipped with an overflow trap, a first column of 20 cm. width and 220 cm. length, a second column of the same width and 110 cm. length and a reflux condenser. At the lower 140 cm. of its length the first column was filled with Raschig rings, at the upper 80 cm. with ordinary sulfur lumps. The vapor outlet means of the first column was connected to the vapor inlet means of the second column; the reflux condenser of the second column was provided with a delivery pipe extending from the foot of the second column to the center of the first column. The second distillation column was charged with Raschig rings at the lower 50 cm. of its length and, above that, at a height of 50 cm., with lumps of a sulfur preparation which was prepared by melting together 0.4 g. of $FeCl_3$ and 400 g. of sulfur.

37.9 kg./h. of a crude thionyl chloride product containing 80.0% of $SOCl_2$, 14.5% of $SCl_2$, 4.3% of $S_2Cl_2$ and 1.1% of $SO_2$ were continually introduced into the distillation vessel. In the continuous operation the mixture in the vessel, which boiled at 92° C., contained 41.5% of $SOCl_2$, 56.3% of $S_2Cl_2$ and 2% of sulfur dissolved in the mixture; 15.8 kg./h. of the mixture flew off via the overflow trap. 1.49 kg./h. of sulfur were consumed in the first column and periodically replenished, while 0.35 kg./h. of the iron-containing sulfur preparation was consumed in the second column and replenished. At the same time, 23.4 kg. of the purified product which was free from sulfur chlorides and which contained more than 99% of water-white $SOCl_2$ were obtained from the condenser.

I claim:

1. A process for recovering thionyl chloride from its admixture with impurities including sulfur monochloride and sulfur dichloride, said process comprising the steps of fractionally distilling said mixture at a temperature below the boiling point of sulfur monochloride and at which a gaseous mixture of thionyl chloride and sulfur dichloride vaporizes, contacting said vapor mixture with sulfur containing an effective amount of an active iron product and thereby converting sulfur dichloride of said vapor mixture to liquid sulfur monochloride, returning said liquid sulfur monochloride as reflux to said mixture containing impurities and removing thionyl chloride as overhead product.

2. Process according to claim 1, wherein said active iron product is selected from the group consisting of iron sulfides, iron oxides, iron chlorides, iron nitrates, iron phosphates, finely divided iron and mixtures thereof.

3. Process according to claim 1, wherein said active iron product is present in an amount of about 0.01 to 10 grams, calculated as iron per 100 grams of sulfur.

4. Process according to claim 1, wherein said active iron product is present in an amount of about 0.02 to 1 gram, calculated as iron per 100 grams of sulfur.

5. Process according to claim 1, wherein the sulfur is present in solid form containing said active iron product in finely divided form therein.

6. A process according to claim 1 wherein said gaseous mixture containing thionyl chloride and sulfur dichloride is contacted with sulfur prior to said contact with sulfur containing an effective amount of an active iron product.

References Cited

UNITED STATES PATENTS

| | | | |
|---|---|---|---|
| 2,539,679 | 1/1951 | Trager | 23—203X |
| 3,155,457 | 11/1964 | Kunkel | 23—203 |

EARL C. THOMAS, Primary Examiner

PO-1050
(5/69)

UNITED STATES PATENT OFFICE
CERTIFICATE OF CORRECTION

Patent No. 3,592,593         Dated   July 13, 1971

Inventor(s)   Benno Bohm

It is certified that error appears in the above-identified patent and that said Letters Patent are hereby corrected as shown below:

Col. 1, line 55, "$S_2Cl$" should read -- $S_2Cl_2$ --.

Col. 3, line 26, "g./hr." should read -- g. --.

Signed and sealed this 11th day of January 1972.

(SEAL)
Attest:

EDWARD M. FLETCHER, JR.
Attesting Officer

ROBERT GOTTSCHALK
Acting Commissioner of Patents